Aug. 25, 1925.  F. WIGHT  1,551,081
VALVE CUP AND METHOD OF MAKING THE SAME
Filed June 17, 1924
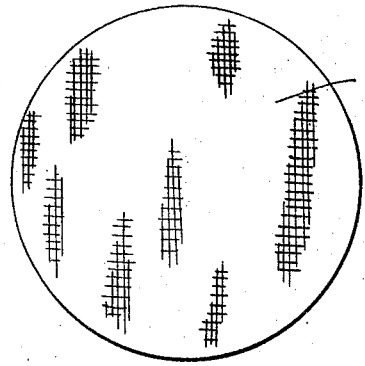
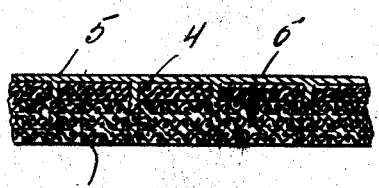
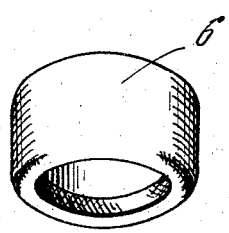
Frank Wight,
Inventor
By Clarence A. O'Brien
Attorney Patented Aug. 25, 1925.

1,551,081

UNITED STATES PATENT OFFICE.

FRANK WIGHT, OF SPRINGFIELD, OHIO.

VALVE CUP AND METHOD OF MAKING THE SAME.

Application filed June 17, 1924. Serial No. 720,630.

*To all whom it may concern:*

Be it known that I, FRANK WIGHT, a citizen of the United States, residing at Springfield, in the county of Clark and State of Ohio, have invented certain new and useful Improvements in Valve Cups and Methods of Making the Same, of which the following is a specification.

This invention relates to valve cups and method of making the same, and it consists in the novel features hereinafter described and claimed.

An object of the invention is to provide an improved valve cup, that will last for an indefinite length of time and which is efficient in use.

The cup is made from canvas and rubber as heretofore, and the improvement consists in combining Babbitt metal with the canvas and rubber and thereby producing a material capable of standing in maximum amount of friction and producing a cup which will afford protection against the different conditions that exist in oil wells.

The beneficial results are obtained by impregnating the outer layers of fabric with Babbitt metal which is first reduced to powdered form and applied in this form to the canvas or fabric. This layer is then placed under a heated plate and pressed, so that the Babbitt metal is softened and impregnated in the fiber of the canvas or fabric. This layer is then assembled with additional layers of fabric and rubber and heated, and the whole structure is then pressed together. The structure is then perforated and is again heated and pressed, whereby the rubber and Babbitt metal are softened and are forced into the perforation and the several layers are efficiently anchored together. Coatings of rubber are then applied to the outer surfaces of the outer layer and subjected to heat and pressure, whereby all crevices are closed and completely filled. The blanks thus formed are then placed in the fold and vulcanized in the usual way.

In the accompanying drawing:

Figure 1 is a fragmentary sectional view of one of the layers of fabric, showing the same impregnated with Babbitt metal.

Figure 2 is a fragmentary sectional view of several layers of fabric.

Figure 3 is a fragmentary sectional view of several layers of the fabric impregnated with the Babbitt metal and perforated, and with the perforations filled with Babbitt metal and rubber.

Figure 4 is a plan view of the blank.

Figure 5 is a perspective view of the valve cup.

Each pair of the blanks consists of a piece of canvas or fabric 1, the texture of which is impregnated with Babbitt metal 2, which is first pulverized and then heated and pressed into the texture of the fabric. Coatings 3 of rubber, are applied to the opposite sides of the layer and the layer is provided with a number of transverse perforations 4. To form the blank, several of the layers are assembled, one upon the other, with the perforation 4, in register with each other, and a mixture of Babbitt metal and rubber is filled into the perforation for forming anchors 5, as shown in Figure 3. After the material is placed in the perforations 4, the blank is placed between heated plates and subjected to pressure whereby the material in the perforations 4 is softened, and the said perforations are completely filled by the said material and form binding anchors. Coatings 6 of rubber are then applied to the outer sides of the blanks and the blank is then vulcanized and pressed into the form of cup as shown in Figure 5 of the drawing.

Having described the invention, what is claimed is:

1. The method of making a valve cup consisting in impregnating the texture of fabric with Babbitt metal and rubber by the application of heat and pressure, assembling several layers of the fabric one upon the other, providing transverse perforations in the layers of fabric, and enclosing the perforations with a mixture of Babbitt metal and rubber and by the application of heat and pressure.

2. In a valve cup, a layer of fabric having its texture impregnated with a mixture of Babbitt metal and rubber.

3. In a valve cup, several layers of fabric arranged one upon the other, the texture of the layers being impregnated with a mixture of Babbitt metal and rubber, the layers having perforations passing transversely therethrough, and a mixture of Babbitt metal and rubber filling the perforations.

In testimony whereof I affix my signature.

FRANK WIGHT.